Figure 1:
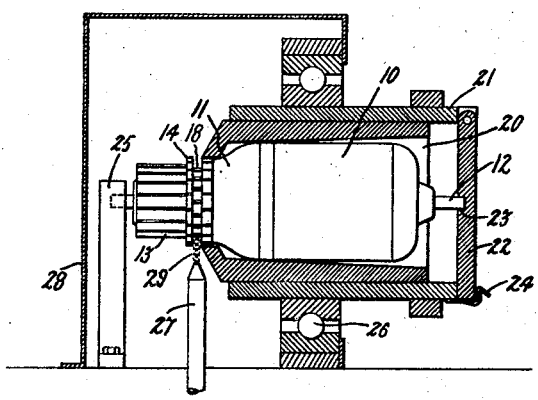

Jan. 6, 1942.  W. H. MILLER  2,269,219
METHOD OF MAKING SOLDERED ELECTRICAL CONNECTIONS
Filed Dec. 8, 1939

Inventor:
William H. Miller,
by Harry E. Dunham
His Attorney.

Patented Jan. 6, 1942

2,269,219

UNITED STATES PATENT OFFICE 2,269,219

METHOD OF MAKING SOLDERED ELECTRICAL CONNECTIONS

William H. Miller, Fort Wayne, Ind., assignor to General Electric Company, a corporation of New York Application December 8, 1939, Serial No. 308,163

9 Claims. (Cl. 29—155.5)

My invention relates to improvements in the method of making soldered connections, and particularly for electrical machines which utilize soldered connections between winding conductor leads and rotatable current collectors.

Various methods have been devised for obtaining a good soldered connection between two conductive elements, such as between a winding conductor lead and a rotatable current collector which will provide a secure mechanical support between the two elements, as well as an electrical connection therebetween having a low resistance. In building small rotating electrical machines adapted to operate at relatively high speed, it has been found difficult to obtain this desirable connection due to the relatively small size of the conductor leads and conductive elements of the current collector. Special precautions must be taken in making such connections not to weaken appreciably the winding conductor where it is connected to the current collector, as if the section of the winding conductor is appreciably reduced, it may be weakened to such an extent that it will break under the action of centrifugal force during normal operation. In order to provide a good electrical and mechanical connection between the conductor lead and a current collector, it is necessary to remove the insulation from around the conductor lead at the portion thereof which is to be soldered to the current collector element. The conventional methods used in removing insulation from conductor leads usually weakens this portion of the conductor, and after the machine has been in operation for a period of time, open circuits may be formed in the winding by the breaking of the conductors adjacent their soldered connection to the current collector. Furthermore, the small size of these conductors make it very difficult to obtain a clean surface which will provide a good electrical connection with the solder as a very small amount of dust or other insulation on the surface of the conductor which may be non-conductive in nature will prevent the formation of the desired electrical connection.

An object of my invention is to provide an improved method of cleaning an element of solderable material for soldering purposes.

Another object of my invention is to provide an improved method of preparing a winding conductor for soldering to a current collector element.

A further object of my invention is to provide an improved method of preparing a rotatable member winding for soldering the winding conductors to a current collector.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 2:
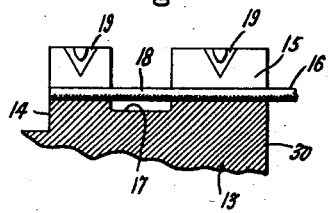
Figure 3:
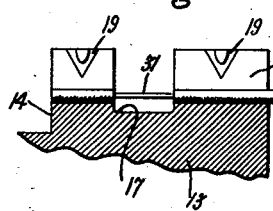
Figure 4:
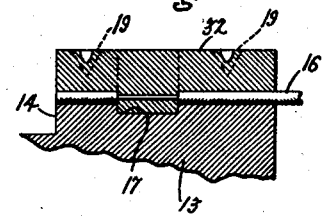
Figure 5:
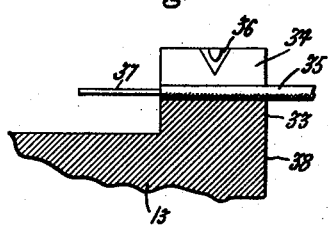
Figure 6:
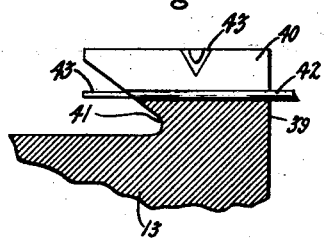

In the drawing, Fig. 1 is a side elevational view, partly in section, illustrating an arrangement for carrying out my improved method of preparing winding conductors of solderable material for soldering to a current collector; Fig. 2 is an enlarged view of a part of a commutator segment and armature conductor lead shown in Fig. 1 before the insulation is removed from the conductor lead; Fig. 3 shows the conductor and commutator segment of Fig. 2 after the conductor has been cleaned for soldering purposes; Fig. 4 illustrates the elements shown in Figs. 2 and 3 after the conductor has been soldered to the commutator segment; Fig. 5 illustrates a modification of the construction shown in Figs. 2 to 4; and Fig. 6 illustrates a further modification of the construction of the current collector and lead shown in the other figures of the drawing.

Referring to the drawing, I have shown in Fig. 1 an improved arrangement for preparing an element of solderable material for soldering to another element of solderable material. In preparing a conductor of solderable material for soldering purposes, it is extremely important that all foreign substances which might prevent the wetting of the surface of the element by the molten solder should be removed. The drawing illustrates an application of my improved method to the preparing of the conductors of a rotatable member of a dynamo-electric machine for soldering to the segments of a commutator. This rotatable member is provided with a core 10 of magnetic material and a winding 11 supported on a shaft 12. A current collector comprising a commutator having segments 13 also is mounted on the shaft 12 adjacent an end of the winding 11. As is more clearly shown in Figs. 2 to 6, inclusive, the commutator segments are provided with risers 14 in which a slot 15 is formed which extends longitudinally of the segment riser. In preparing the winding 11 for soldering to the segments 13, conductor leads 16 are arranged to extend into the slots 15 of the risers 14 and are placed in the slots before removing the insulation therefrom, as shown in Fig. 2. In the construction shown in Figs. 2 to 4, inclusive, the riser 14 is formed with a circumferentially extending slotted portion 17 over which a portion 18 of an end of the conductor lead 16 is placed, so that it is arranged in spaced relation above the commutator segment at 17. The conductor lead 16 then is secured in this position by staking punches 19 which temporarily hold the conductor in position with respect to the commutator segment riser 14. When all of the winding conductor leads have been arranged in this manner in their respective commutator segment slots, the rotatable member is placed in a mounting member 20 and is secured therein by a clamp 21. This clamp is provided with an end head 22 having an opening 23 therein, and the head 22 is clamped over one end of the shaft 12 and held in closed position by a latch 24. The other end of the shaft 12 is rotatably mounted in an upwardly extending support 25, and the entire rotatable member clamping assembly is rotatably supported by ball bearings 26.

In order to remove the insulation from the portion 18 of the conductor 16 and to clean this portion of the conductor without forming a layer of powder of non-solderable material on this portion of the conductor or upon the adjacent portion of the commutator segment, I provide an arrangement for blasting this portion 18 of the conductor by a finely divided solderable material. As shown in Fig. 1, a nozzle 27 is arranged adjacent the commutator segment portion 13 in which the circumferentially extending slot 17 is formed. A cover 28 is arranged over this portion of the blasting machine, so as to collect the finely divided solderable material and the insulation during the blasting operation to prevent its escape into the surrounding atmosphere.

In carrying out my improved method, the portion 18 of the conductor away from the part of the conductor 16 at the end 30 of the commutator segment 13 is forcibly contacted by finely divided solderable material, such as powdered brass, copper, bronze, or the like, which is blasted against the surface of this portion of the conductor through the blasting nozzle 27, as shown at 29 in Fig. 1. This blasting operation removes the insulation from the portion 18 of the conductor and leaves a clean surface 31 on the conductor, as shown in Fig. 3. I have found that this blasting process does not leave a coating of powdered unsolderable material on the surface 31 of the conductor, which might prevent the formation of a good electrical and mechanical soldered connection between this surface of the conductor and molten solder. Furthermore, this blasting also does not leave an unsolderable powdered coating upon the surface of the slots 15 and 17 which might prevent the formation of good soldered connection therewith. After the entire set of winding conductor leads 16 has been cleaned in this manner, solder 32 is applied to the commutator segment risers 14, thus filling the slots 15 and 17 and forming a secure mechanical and electrical connection between the conductor leads 16 and the commutator segment risers 14. This type of soldered connection and the method of thus soldering conductor leads to commutator segments are not my invention, but are the invention of Lawrence F. Hemphill and are disclosed and claimed in his copending application Serial No. 303,243, filed November 7, 1939.

In Fig. 5, I have shown a modification of the commutator segment riser and conductor arrangement wherein the commutator segment 13 is provided with a riser 33 having a slot 34 extending longitudinally thereof in which an end 35 of a winding conductor is secured by a staking punch 36. The outer end 37 of the winding conductor lead is arranged to extend beyond the riser 33 in spaced relation above a portion of the commutator segment 13. The insulation is removed from this end 37 of the conductor and is cleaned by forcibly contacting the surface thereof with finely divided solderable material, as explained with respect to Figs. 1 to 4, inclusive. By arranging the end of the conductor 37 in spaced relation above the segment 13, the blasting operation removes substantially all of the insulation from about this portion of the conductor and cleans the surface thereof around the entire periphery. Furthermore, this insures that the finely divided particles of solderable material will not become clogged between the end 37 of the conductor and the segment 13. The soldering operation with this particular arrangement is substantially the same as that shown in Figs. 1 to 4, inclusive, and since the insulation is removed from the conductor at a portion thereof removed from the outer edge 38 of the commutator segment, the solder will not penetrate the conductor beyond its connection to the segment, and therefore, will not embrittle and weaken this portion of the conductor.

In Fig. 6, I have shown another arrangement similar to that shown in Fig. 5, in which the commutator segment 13 is provided with a riser 39 having a longitudinally extending slot 40 formed therein, and is also provided with a circumferentially extending V-slot 41. An end of an insulated conductor 42 is arranged in the slot 40 with the outer portion 43 thereof extending into the V-slot 41 in spaced relation above a portion of the commutator segment 13. This end of the conductor is temporarily secured in position in the slot 40 by a staking punch 44, after which the insulation is removed and the conductor cleaned on the outer portion 43 thereof by forcibly contacting the surface of the conductor by a finely divided solderable material which is blasted against this portion of the conductor in any suitable manner, such as that shown in Fig. 1. A soldered connection then is formed between the end 43 of the conductor and the commutator segment 13 in a manner similar to that explained with respect to Figs. 1 to 4, inclusive.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. The method of making a soldered electrical connection between elements of solderable material which includes cleaning an element formed of solderable material by forcibly contacting the surface of one element by a finely divided solderable material, and soldering together the elements.

2. The method of making a soldered electrical connection between elements of solderable material which includes cleaning an element formed of solderable material by securing the element in spaced relation above another element to which the first element is to be soldered, forcibly contacting the surface of the first element by a finely divided solderable material, and soldering together the two elements.

3. The method of preparing a winding conductor for soldering to a current collector element which comprises securing the conductor to an element, and removing the insulation and cleaning a part of the winding conductor above the element by forcibly contacting the surface of the conductor by a finely divided solderable material.

4. The method of preparing a winding conductor for soldering to a current collector element which comprises securing the conductor to an element, and removing the insulation and cleaning a part of the conductor away from the part thereof adjacent the outer edge of the element and in spaced relation over the element by forcibly contacting the surface of the conductor by a finely divided solderable material.

5. The method of making a soldered electrical connection which includes preparing a winding conductor for soldering to a current collector element comprising arranging a part of a conductor in spaced relation over a portion of an element, removing the insulation and cleaning the part of the conductor in spaced relation with respect to the element by forcibly contacting the surface thereof by a finely divided solderable material, and soldering the part of the conductor from which the insulation has been removed to the current collector element.

6. The method of preparing a winding conductor for soldering to a current collector element which comprises forming a slot in an element, placing an insulated conductor in the element slot, and removing the insulation and cleaning a part of the conductor above the element by forcibly contacting the surface thereof by a finely divided solderable material.

7. The method of preparing an armature conductor for soldering to a commutator segment which comprises forming a slot longitudinally of an end of the commutator segment, placing an insulated end of an armature conductor in the segment slot, securing the conductor in the segment slot, and removing the insulation and cleaning a part of the armature conductor away from the part thereof adjacent the outer edge of the commutator segment by forcibly contacting the surface thereof by a finely divided solderable material.

8. The method of preparing an armature winding having conductors adapted to be soldered to commutator segments which comprises securing parts of the conductors to segments of the commutator with a portion of the conductors arranged in spaced relation above the commutator segments, and removing the insulation and cleaning the conductor portions arranged in spaced relation over the commutator segments by forcibly contacting the surface of these conductor portions by a finely divided solderable material.

9. The method of preparing an armature winding having conductors adapted to be soldered to commutator segments which comprises rotatably mounting the armature, securing parts of the conductors to segments of the commutator with a portion of the conductors arranged in spaced relation above the commutator segments, removing the insulation and cleaning the conductor portions arranged in spaced relation over the commutator segments by forcibly contacting the surface of these conductor portions by a finely divided solderable material, and rotating the armature in its mounting to insure complete removal of the insulation and cleaning of all of said conductor portions about the periphery of the commutator.

WILLIAM H. MILLER.